Figure 1:
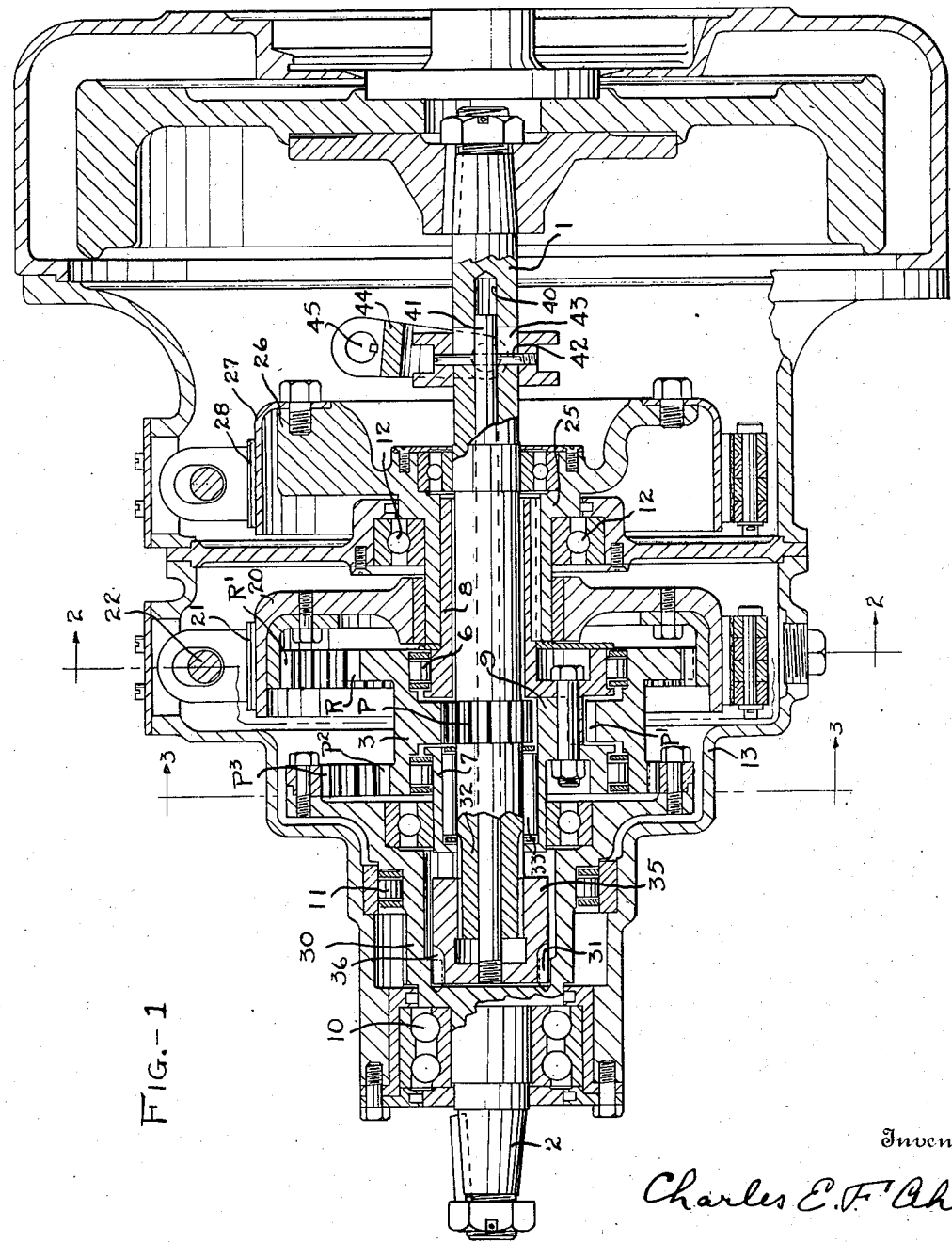

March 15, 1927.  1,620,858

C. E. F. AHLM

TRANSMISSION GEARING

Filed Dec. 30, 1924   2 Sheets-Sheet 1

Inventor
Charles E. F. Ahlm
By Bates, Macklin,
Goldrick & Teare   Attorneys

March 15, 1927.

C. E. F. AHLM 1,620,858

TRANSMISSION GEARING

Filed Dec. 30, 1924

2 Sheets-Sheet 2

Inventor
Charles E. F. Ahlm
By Bates, Macklin
Goldrick & Teare
Attorneys

Patented Mar. 15, 1927.

1,620,858

UNITED STATES PATENT OFFICE.

CHARLES E. F. AHLM, OF CLEVELAND, OHIO, ASSIGNOR TO AUTOMOTIVE PATENT HOLDING COMPANY, OF CLEVELAND, OHIO, A CORPORATION OF DELAWARE.

TRANSMISSION GEARING.

Application filed December 30, 1924. Serial No. 758,944.

This invention relates to transmission gearing and is particularly concerned with the provision of a gearing for transmitting a plurality of speeds and a reverse drive from a driving member such as the engine shaft of an automobile to the propeller or rear axle driving shaft. The general object is to provide an efficient form of change speed gearing capable of being easily and cheaply manufactured.

The invention employs the principle of a rotating and revolving internal-external gear in mesh with each of a pair of driving and driven members whereby a great amount of power may be transmitted at different speeds with a minimum amount of noise. This construction of gears admits changing from one speed to another without necessitating the usual clashing resulting from moving the gears into mesh with each other.

In my copending application filed December 30, 1924. Serial No. 758,940, I have shown, described and claimed such a gearing having an eccentric bearing for the internal-external gear surrounding the driving shaft and adapted to be connected with the driving member to prevent any relative rotation between it and the internal-external gear and hence either of the driving or driven members, thus securing direct drive. Means are also therein disclosed for retarding the rotating movement of the internal-external gear while the eccentric is left free to rotate, whereby a creeping backward movement is imparted to the driven member. Another capability is that of preventing any rotation of the eccentric bearing for still another speed in which case all of the gears operate as simple reduction or multiplying gears depending upon their relative sizes.

The primary distinguishing characteristic of this invention is that I have provided means for positively clutching the driving and driven members together in a very simple manner to effect direct drive. The means for accomplishing the other two speeds mentioned is essentially the same.

Another characteristic which I desire to specifically set out in this application is that of providing an internal-external geared connection between the composite gear and a braking member for retarding the rotating movement of said composite gear while not entirely preventing the rotation thereof. This characteristic may be embodied in an external gear on the composite gear member and an internal gear on the braking member as shown in the drawings or an external gear on the braking member and an internal gear on the composite member, while the gear ratios may of course be varied as desired.

Other features and objects of the invention will become apparent in the following description which relates to the accompanying drawings, wherein the invention is illustrated in its preferred form. The essential novel characteristic will be summarized in the claims.

Figure 2:
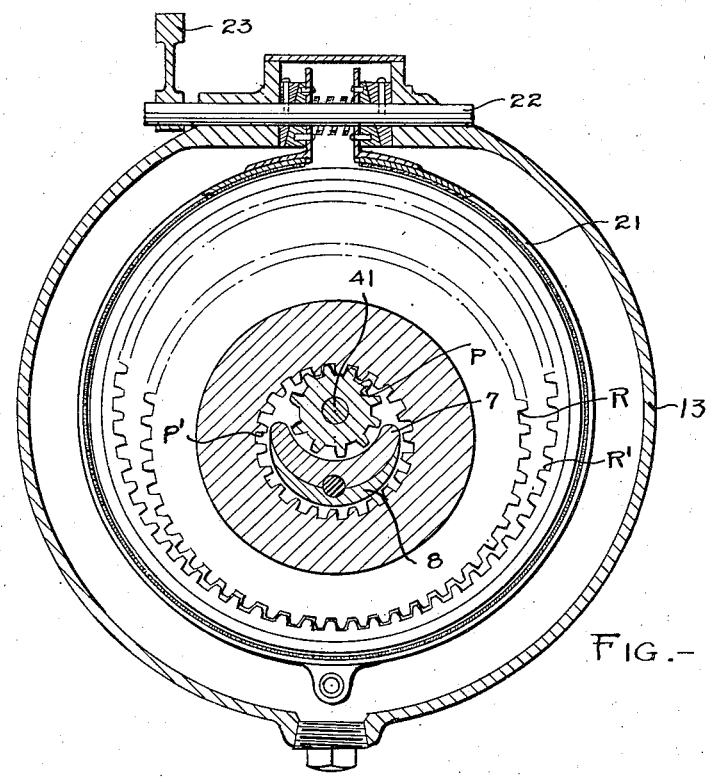
Figure 3:
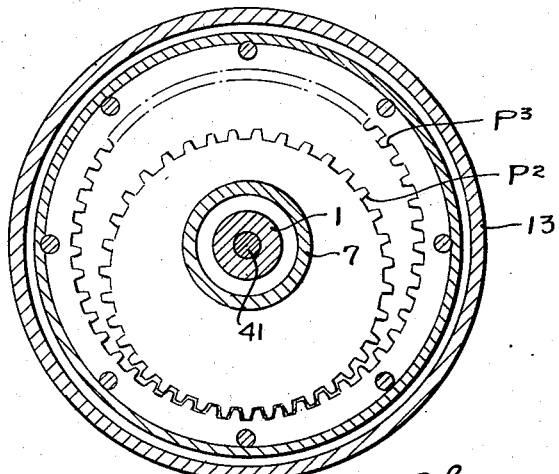

In the drawings, Fig. 1 is a substantially axial longitudinal section through my gearing; Fig. 2 is a transverse section taken along the lines 2—2 of Fig. 1; Fig. 3 is a similar transverse section taken along the line 3—3 of Fig. 1.

The gearing comprises essentially a driving member which is indicated at 1, a driven member indicated at 2, and gearing for connecting the members including pinion teeth P on the driving member, internal and external teeth $P^1$ and $P^2$ respectively on a revoluble and rotatable composite gear member 3 and gear teeth $P^3$ carried rigid with the driven member meshing with the gear $P^2$. The gear member 3 is mounted on an eccentric bearing 6 shown as surrounding the driving member and having tubular end portions 7 and 8 at either side of the pinion. I have shown the two portions of the eccentric bearing as separate parts held together by a connecting portion 9 extending between the non-meshing regions of the pinion and internal gear $P^1$. All of the relatively rotatable members just described are provided with anti-friction bearings and the members are shown as finally supported by roller bearings 10 and 11 and 12 carried by various portions of a casing 13.

In connection with the bearing and gear arrangements, it will be noted that the composite gear has a rolling bearing at each side of the pinion P and that the external teeth on the composite gear are in longitudinally offset relation to the internal teeth and as shown are well supported by reason of being substantially in the same transverse planes as the rolling bearings.

The means above referred to for retarding the rotating movement of the internal-external gear 3 comprises gear teeth on the exterior of the member 3 indicated at R and cooperating gear teeth indicated at R¹ and carried by braking member 20. For holding the member 20 against rotation when the slowest speed (in this case reverse) is desired, I provide a cooperating brake member 21 which may be operated by a shaft 22 and an arm 23.

It results from this arrangement that when the brake 21 is applied the teeth R¹ are held stationary and therefore retard the rotation of the composite gear 3 and it is apparent that if it were not for the fact that the eccentric bearing 6 is now permitted to rotate freely the composite gear could not be moved. The reactions are such that the eccentric bearing is now rotated in a direction opposite that of the driving member and the composite gear 3 simply circulates or revolves on the eccentric, therefore since the gear P² is smaller than the gear P³ a slow reverse movement is imparted to the gear P³ and the propeller member 2.

For a reduced forward speed the eccentric bearing 6 is held against rotation. The means to accomplish this may comprise a tubular member 25 rigid with the eccentric and having a counterweight portion 26 to counterbalance the eccentric and having also a braking member 27. Another braking member 28 may cooperate therewith to hold the brake member 27 and hence the eccentric bearing 6 against rotation. For this condition the member 20 is of course allowed to rotate idly except in case it is desired to use the brake 21 to slow down the speed of the propeller shaft in the manner of an ordinary service brake. The resulting speed of the propeller shaft with relation of the driver 1 is simply the compound reduction of the gears P, P¹, P² and P³.

The manner of effecting of direct drive between the driving and driven members is the primary distinguishing characteristic of the gearing shown, and consists as shown in providing a dental clutch between the driving member and the propeller and I preferably arrange for operating this clutch from a forward portion of the casing 13 in the following manner. The propeller member is shown as having a tubular portion 30 having clutch teeth 31 formed in the interior thereof. The driving shaft is shown as projecting from its bearing 33 at its rearward end 32 and carries a substantially cylindrical cup-like member 35 preferably splined thereto and having clutch teeth formed on the rearward end thereof. The teeth cooperate with those of the propeller. Means for actuating this clutching member 35 may consist of a bar 41 rigid with the cylindrical member 35 and extending into an opening 40 in the driving shaft preferably to a position forwardly of the eccentric bearing. A shifting collar slidably engages the exterior of the shaft and is made rigid with bar 41 by means of a through pin 42 extending into slots 43 in the shaft. The collar may be channeled as shown and may be operated in the usual manner by a bifurcated arm 44 supported on a shaft 45 journaled in the casing.

If desired, I may vary any of the above described mechanism in view of the changing conditions which may arise in the manufacture of my gearing without departing from the intended scope of my invention. For instance, I may provide the propeller shaft with the shifting bar in which case the clutch would be located in the forward portion of the casing.

It will be seen that I have provided a very simple means for effecting the connection of normally separated rotating members, particularly adaptable to the above described form of gearing and which is capable of being very easily and cheaply manufactured from a minimum number of parts and easily and quickly assembled. Changes may be made in the construction to attain different speed relations, the proportions shown being simply for illustration and I do not otherwise wish to limit myself to inessential details.

Having thus described my invention, I claim:

1. In a transmission gearing in combination, a shaft, a rotatable and revoluble hollow gear member in surrounding and off-set relation thereto and having a geared connection therewith, another shaft having a geared connection with said gear member, a brake and a gear on the brake cooperating with the gear member for retarding the rotating movement of the gear member but permitting it to revolve for connecting the shafts at one speed, clutch members drivingly rigid with both the driving and driven members, and means for causing the members to cooperate for effecting direct drive.

2. In a transmission gearing, a driving member, gear teeth carried thereby, a hollow composite gear member embracing said member having gear teeth in mesh with teeth of the driving member and capable of a revolving movement about an axis concentric with the driving member and of a rotating movement on an axis eccentric to the driving member, a driven member in axial alignment with said driving member and having a gear rigid therewith adapted to engage said composite gear and be driven thereby, and means including dental clutch members rigid with the driving and driven members, whereby the said members may be coupled together for direct drive.

3. In a gearing, in combination, a driving shaft, a pinion carried thereby, an eccentric bearing exteriorly of said shaft, a composite hollow gear member in surrounding relation to the shaft capable of a rotating and revolving movement carried by said eccentric bearing and having teeth in mesh with the pinion, a driven member in geared relation with said composite gear, a brake member having a geared connection with said composite gear and means for cooperating therewith to restrain the rotating movement of the composite gear while permitting the revolving movement thereof for imparting a low speed to the driven member, another braking member rigid with the eccentric bearing for preventing the rotation of the bearing for a higher speed, and clutching means independent of both of said braking members for effecting a rigid direct connection between said driving and driven members for direct drive.

4. In a transmission gearing, a driving and a driven member, external gear teeth carried by the driving member, an internal-external gear member capable of being revolved about an axis concentric with the driving member and rotated on an axis eccentric thereto and in mesh with said gear teeth, a gear rigid with said driven member in mesh with said internal-external gear, and means including a gear on said internal-external gear member and another gear meshing therewith, for retarding the rotation of the internal-external gear for causing the driven member to be rotated at a low speed.

5. In a transmission gearing, a driving member, a composite gear member mounted eccentrically relative thereto and having a geared connection therewith, a driven member having a geared connection with the composite gear member, a member mounted for free rotation and means for controlling said rotation, a connection between the composite gear and said freely rotating member, whereby said control may operate to restrain the movement of the composite gear for effecting a given speed relation between the driving and driven members, and clutch members rigid with the driving and driven members respectively, one of said last named members being centrally recessed and means rigid with one of said clutch members and extending through such recess to a point remote from the clutch, means cooperating therewith to couple said members together.

6. In a transmission gearing in combination, a driving member, a rotatable and revoluble gear member in eccentric relation thereto and having a geared connection therewith, a driven member having a geared connection with said gear member, means for retarding the rotating movement of the gear member while permitting it to revolve for imparting a given speed from the driving member to the driven member, clutch elements rigid with said driving and driven members respectively, one of said clutch elements being slidable, and an operating rod extending through one of said last mentioned members to a point remote from the clutch and rigid with said slidable member, and means cooperating with the rod at such remote point for operating the clutch to couple the driving and driven members together for direct drive.

7. In a transmission gearing in combination, a driving member, a pinion rigid therewith, a composite gear having teeth in mesh with the pinion, an eccentric bearing member for supporting the composite gear, a gear rigid with the driven member in mesh with the composite gear, clutch means rigid with the driven member, cooperating clutch means in splined relation with the driving member, means for restraining the rotation of the eccentric bearing, said means also being operable to release the bearing for free rotation, each of said operations resulting in effecting different speed relations between the rotatable members, and the rod extending through the driving member to a point remote from the clutch and rigid with the splined clutch member, and means for operating the rod at such remote point for coupling said rotating members directly together for a third speed.

8. In a transmission gearing, a driving member and a driven member, said driven member having an internal gear rigid therewith, a pinion on the driving member, a composite gear member having teeth in mesh with the pinion and said internal gear, an eccentric bearing for the composite gear member surrounding the driving member and having a rolling bearing support for one end thereof in the driven member, a rolling bearing interposed between the driving member and said eccentric bearing member, clutch members carried by the driving and driven members respectively, and means for operating said clutch members to couple the driving and driven members together for direct drive.

In testimony whereof, I hereunto affix my signature.

CHARLES E. F. AHLM.